(12) United States Patent
Garbin et al.

(10) Patent No.: US 9,628,969 B2
(45) Date of Patent: Apr. 18, 2017

(54) TERMINATING AN INCOMING CONNECTION REQUEST AND ACTIVE CALL MOVEMENT

(71) Applicant: Unify GmbH & Co. KG, Munich (DE)

(72) Inventors: Christian Garbin, Boca Raton, FL (US); Jeff McNiece, Atlantis, FL (US)

(73) Assignee: Unify GmbH & Co. KG, Munich (DE)

( * ) Notice: Subject to any disclaimer, the term of this patent is extended or adjusted under 35 U.S.C. 154(b) by 66 days.

(21) Appl. No.: 14/402,846

(22) PCT Filed: May 3, 2013

(86) PCT No.: PCT/US2013/039450
§ 371 (c)(1),
(2) Date: Nov. 21, 2014

(87) PCT Pub. No.: WO2014/178875
PCT Pub. Date: Nov. 6, 2014

(65) Prior Publication Data
US 2015/0181398 A1 Jun. 25, 2015

(51) Int. Cl.
*H04M 3/42* (2006.01)
*H04W 4/16* (2009.01)
*H04L 29/08* (2006.01)
*H04W 4/02* (2009.01)
*H04W 76/04* (2009.01)

(52) U.S. Cl.
CPC ......... *H04W 4/16* (2013.01); *H04M 3/42263* (2013.01); *H04L 67/148* (2013.01); *H04M 2242/30* (2013.01); *H04W 4/02* (2013.01); *H04W 76/041* (2013.01)

(58) Field of Classification Search
CPC .. H04L 67/148; H04W 4/16; H04W 36/0022; H04M 3/543
See application file for complete search history.

(56) References Cited

U.S. PATENT DOCUMENTS

| | | | |
|---|---|---|---|
| 2003/0023431 A1 | 1/2003 | Neuberger | |
| 2009/0143053 A1* | 6/2009 | Levien | H04W 4/16 455/417 |
| 2013/0212287 A1* | 8/2013 | Chappelle et al. | 709/227 |

FOREIGN PATENT DOCUMENTS

| | | |
|---|---|---|
| WO | 2007118250 A2 | 12/2007 |
| WO | 2012074643 A1 | 6/2012 |
| WO | 2012074737 A1 | 6/2012 |

OTHER PUBLICATIONS

International Search Report for PCT/US2013/039450 dated Nov. 21, 2013.

(Continued)

*Primary Examiner* — Keith Fang
(74) *Attorney, Agent, or Firm* — Buchanan Ingersoll & Rooney PC

(57) ABSTRACT

In a telecommunications network, an incoming connection request to a primary (mobile) device may be terminated at a selected secondary device based on location information (WiFi connectivity, GPS location, Bluetooth connection). Similarly, a user may move an existing connection from the primary device to the secondary device, and back, by simple interaction with the primary device. A Mobile Device Application (MDA) resident in the primary device may control the termination and movement of connection requests and connections.

18 Claims, 3 Drawing Sheets

(56) References Cited

OTHER PUBLICATIONS

Written Opinion of the international Searching Authority for PCT/US2013/039450 dated Nov. 21, 2013.

* cited by examiner

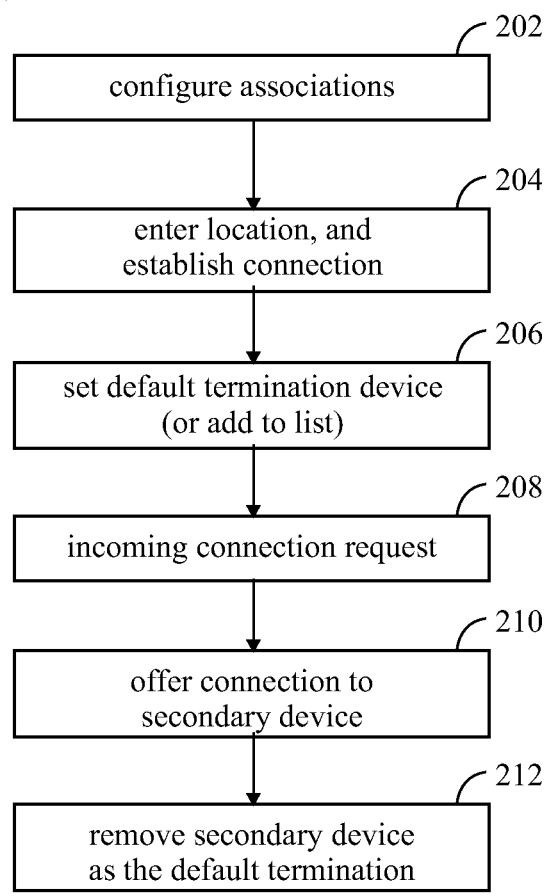

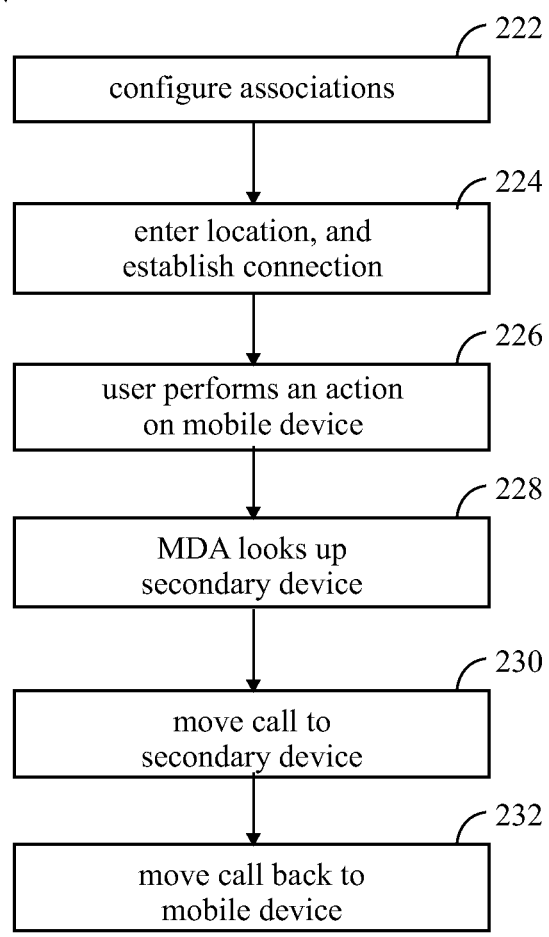

TERMINATING AN INCOMING CONNECTION REQUEST AND ACTIVE CALL MOVEMENT

TECHNICAL FIELD

The invention relates generally to telecommunications systems and methods, and more particularly to method and apparatus for telephony call control. The invention further relates to a computer program product for executing such a method and to a system implementing the method.

BACKGROUND

A telecommunications network may provide connectivity for several users having communication devices. A given user may have more than one communication device, such as a smartphone, a portable or desktop computing device, an office phone, and the like. When connection requests (inbound calls) are routed by the network to a given user, the user may wish to answer the call (terminate the connection request) with a selected one of the devices at their disposal. Similarly, after answering a call, the user may wish to move a call from one device to another.

EP 1 298 900 A1 (Siemens, 2003), incorporated by reference herein, discloses telephony call control using a personal digital assistant (PDA) with a wireless link. A server computer coupled to a CTI (computer telephone integration) capable telephone or a Teleworking-Server coupled to a PBX (private branch exchange) is also coupled to a wireless gateway/router and is provided with communications software. A personal digital assistant (PDA) with wireless capabilities or a cell phone with computing capabilities is provided with corresponding communications software for communicating via the wireless network with the server. The server monitors one or more phone numbers associated with each client. When a call comes in, the server immediately notifies the client. The client can direct the server to transfer the call to a nearby phone. This can be accomplished by parking the call in a system slot and by retrieving the call with a nearby desk phone, thus not needing to know the number of the desk phone. Otherwise, the client can have the call forwarded to another telephone number. The client can also redirect the call to voicemail or a personal messaging system.

U.S. Pat. No. 7,202,814 (Siemens, 2007), incorporated by reference herein, discloses system and method for presence-based area monitoring. A telecommunications device includes a positioning controller adapted to determine positioning information for said telecommunications device; and a wireless communications controller adapted to receive said positioning information from said positioning controller and cause said positioning information to be transmitted to an associated administration device when said telecommunications device is determined to be out of a predetermined range.

The present invention relates to how calls may be terminated by a user with a selected one of their devices, and how calls may be moved between a user's devices. Currently, some type of manually driven action is required to search and locate the connection information and then more manual actions are needed to actually move the connection. For example, the movement of the voice/data connection is a manual action where the device to move the connection to has to be manually identified or selected, such as looking up the device's DN (directory number) in a Contact List.

SUMMARY

It is an object of the invention to provide improved techniques for terminating incoming call requests and moving active calls.

These and other drawbacks in the prior art are overcome in large part by a system and method according to embodiments of the present invention. The techniques disclosed herein allow for moving between phone type devices.

One of a user's devices, such as a mobile device, may be designated a "primary" device, and other of the user's devices such as a desk phone or BETDD (Bluetooth Enabled Telephony/Data Device) may be designated as "secondary" devices.

A Mobile Device Application (MDA) for managing call termination and movement may be resident on the user's primary (hereinafter "mobile") device. Calls may be terminated or moved based on some sort of "location identifier" for the secondary device, such as (i) connection with a specific access point (which may be a WiFi router) in the network, (ii) GPS location (iii) a Bluetooth connection between the user's mobile device and the secondary device.

Calls may be moved automatically by creating a new connection with a selected secondary device by associating the secondary device via the Mobile Device Application (MDA) running on the user's (primary) mobile device.

According to an example of the invention, generally, when a user's mobile device has (i) connected to a specific WiFi router, or (ii) moved to a specific GPS location, or (iii) connected with a Bluetooth Enabled Telephony/Data Device (BETDD) secondary device, incoming connection requests to the mobile device may automatically be terminated at a secondary device based on a location identified. such as (i) the secondary device is connected with the WiFi router, or (ii) at the GPS location, or (iii) which is the BETDD, respectively.

According to an example of the invention, generally, an existing telephony/data connection can easily be moved from a mobile device to a secondary device (i) using WiFi router connected to a Mobile Device, or (ii) using GPS location of a Mobile Device, or (iii) using Bluetooth connectivity between a mobile device and a Bluetooth Enabled Telephony/Data Device (BETDD) secondary device based on a location identified for the secondary device, by (i) associating a telephony/data capable secondary service with a WiFi Router (such as an office or home WiFi Router, a hotel room WiFi Router, etc), or (ii) associating a telephony/data capable secondary device with a GPS location (such as an office or home phone, a hotel room phone, etc), or (iii) identifying a BETDD secondary device via its Bluetooth connection, respectively. The user may initiate movement of the connection by any of a motion of the mobile device by interacting with the mobile device, such as a shake or downward swing, a gesture or selection on the screen of the mobile device such as button selection or swiping action, or a voice command to the mobile device, or the like.

A computer program product for executing the inventive method as outlined above may be provided. The computer program product may be a software product comprising instructions. The computer program product may be comprised by a machine readable medium wherein the machine readable medium may be a floppy disk, a CD (compact disc), a DVD (digital versatile disc), or any other suitable digital or analogue medium.

Other objects, features and advantages of the invention(s) disclosed herein may become apparent from the following description(s) thereof.

BRIEF DESCRIPTION OF THE DRAWINGS

Reference will be made in detail to embodiments of the disclosure, non-limiting examples of which may be illustrated in the accompanying drawing figures (FIGs). The figures are generally in the form of diagrams. Some elements in the figures may be exaggerated, others may be omitted, for illustrative clarity. Some figures may be in the form of diagrams. Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Different "versions" or iterations of elements may be referenced by reference numerals having the same numbers (###) followed by a different letter suffix (such as "a", "b", "c", or "A", "B", "C", or the like), in which case the similar elements may be inclusively referred to by the numeric portion (###) only of the reference numeral.

FIG. 2A is a diagram showing a sequence of steps and events which may occur or be present in an exemplary method for terminating an incoming connection request.

FIG. 2B is a diagram showing a sequence of steps and events which may occur or be present in an exemplary method for performing active call movement.

DETAILED DESCRIPTION

Figure 1:
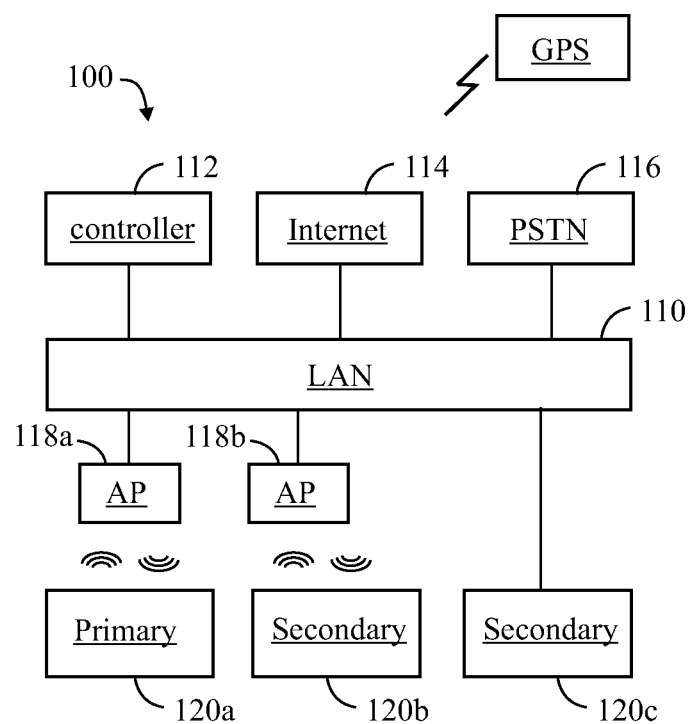
FIG. 1 is a diagram illustrating an exemplary telecommunications system which may be suitable for implementing various embodiments of the invention.

Various embodiments may be described to illustrate teachings of the invention, and should be construed as illustrative rather than limiting. It should be understood that it is not intended to limit the invention to these particular embodiments. It should be understood that some individual features of various embodiments may be combined in different ways than shown, with one another. There may be more than one invention described herein.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Reference herein to "one embodiment", "an embodiment", or similar formulations, may mean that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following descriptions, some specific details may be set forth in order to provide an understanding of the invention(s) disclosed herein. It should be apparent to those skilled in the art that these invention(s) may be practiced without these specific details. Headings (typically underlined) may be provided as an aid to the reader, and should not be construed as limiting.

Any dimensions and materials or processes set forth herein should be considered to be approximate and exemplary, unless otherwise indicated.

FIG. 1 illustrates an exemplary telecommunications system 100 which provides a context for discussing some of the various embodiments of the invention disclosed herein.

An enterprise network may comprise a local area network (LAN) 110 operating under control of a controller 112.

A gateway 114 may be connected in the network 110 to provide for connectivity, via the Internet, with other users within the enterprise in a wide area network (WAN), and also to provide for connectivity with other users outside of the enterprise.

A gateway 116 may be connected in the network to provide for connectivity with the public switched telephone network (PSTN) to allow for communication with users who are not in the LAN or WAN, or otherwise accessible via the Internet gateway 114.

Two wireless access points (APs) 118a and 118b are illustrated, as exemplary of several access points (APs) which may be distributed throughout the LAN (or WAN). An "access point" (AP) may be a "WiFi router", and the terms may be used interchangeably herein. Typically, when the WiFi routers 118a and 118b are in an enterprise system (as contrasted, for example, with a public "hotspot"), access to the routers will be password-protected.

A wireless (or WiFi) router is a device that performs the functions of a router, but also includes the functions of a wireless access point and a network switch. (A router is a device that forwards data packets between computer networks, creating an overlay internetwork.) A WiFi router is commonly used to provide access to the Internet or a computer network. It does not require a wired link, as the connection is made wirelessly, via radio waves. It can function in a wired LAN (local area network), in a wireless-only LAN (WLAN), or in a mixed wired/wireless network. Most current wireless routers have the following characteristics:

WiFi (also spelled Wifi or Wi-Fi) is a wireless technology based on the Institute of Electrical and Electronics Engineers (IEEE) 802.11 standards. Bluetooth is another wireless technology standard which will be mentioned herein. When the term "wireless" is used herein, it should generally be taken to mean WiFi, unless otherwise stated or apparent from context. In the examples set forth herein, the "wireless" access points (AP) 118a and 118b operate using WiFi, and may be WiFi routers.

Three client devices 120a, 120b and 120c are illustrated, as exemplary of a number of client devices which may be utilized by a given user. One of the devices 120a may be designated as a "primary" device, and the other devices 120b and 120c may be designated as "secondary" devices.

As illustrated, the primary device 120a and the secondary device 120b may both be enabled to connect wirelessly (such as by Wi-Fi), through any of the access points (AP) 118a, 118b with the LAN 110, and the secondary device 120c is wired (connected with a cable) to the LAN 110.

The "primary" device 120a may be a mobile device such as a smartphone, personal digital assistant (PDA), handheld computing device (or simply "handheld"), tablet, laptop computer, or the like, having an operating system (OS), and capable of running various types of application software ("apps").

The "primary" device may have Wi-Fi capability, may also be equipped with Bluetooth and GPS (global positioning system) capability. A GPS-enabled device is capable of readily determining its physical location, based on signals from GPS satellites (shown simply as "GPS" in the figure) from which a user's physical location may be inferred.

The "primary" device 120a (which may be referred to hereinafter as a "mobile device") may include a display screen (or simply "display") with touch input (touchscreen) and/or a miniature keyboard. Interaction of a user with a touchscreen may include various gestures such as swiping the screen to activate a feature, as well multi-touch and "tap-click" gestures. The "primary" device 120a may incorporate a graphical user interface (GUI) which allows the user to interact with the device 120a using images rather than text commands.

Some devices such as smartphones may incorporate at least a tilt sensor and sometimes an accelerometer for the purpose of altering what is being displayed (such as rotating an image) or controlling the operation of the device such as by moving or shaking device to implement a function. Some devices such as smartphones may also be responsive to voice commands. Devices such as smartphones may also have buttons and keypads allowing a user to make inputs.

The "secondary" devices 120b and 120c may include mobile devices such as described above, as well as "non-mobile" devices such as phones (including office phones, home phones and conference room phones), as well as personal computers (PCs), and the like, and may be connected in the LAN 110 via a wired link such as with cables (such as but not limited to Ethernet). The "secondary" devices 120b and 120c may have some or all of the functionality as the "primary" device 120a, as may be evident from the context in the discussion(s) that follow.

In the examples that follow, the "primary" device is generally a mobile device, capable of moving around (in the user's possession) between different locations, in and out of reach of the Wi-Fi routers, and the "secondary" devices are generally non-mobile devices, although they may be other mobile devices in the user's possession. The "primary" device 120a and "secondary" devices 120b, 120c may each be assigned a unique uniform resource identifier (URI). Devices such as phones which are non-mobile devices and which remain in a given location may each have a unique directory number (DN) associated therewith.

Terminating an Incoming Connection Request

Current Mobile Device Applications (MDAs) allow for a user selection which of several devices will handle an incoming connection request (call), and the device which is selected to terminate incoming calls may be referred to as a "preferred device". The selection process varies but typically may provide the user with a Graphical User Interface (GUI) to select the preferred device for terminating the connection request. This selection process may be a time-consuming process requiring several seconds, or more for the user to execute, especially if searches or data entry is required to specify the terminating device selection. This selection process may start only after the connection request has initiated, but prior to the connection requester (calling party) giving up, or timing out. Since the process of specifying or re-specifying a preferred device to handle a call request may jeopardize answering the call, the selections provided are normally static (remain unchanged, after initially set) in nature to allow for a quick selection.

According to some embodiments of the invention, automatic selection of a preferred "secondary" device to terminate (answer, handle) an incoming connection (call) request to a user's "primary" device (which may be referred to herein as the user's "mobile device") may be based on onetime configurations set in a Mobile Device Application (MDA) in the user's mobile device which incorporates one or more of WiFi, GPS or Bluetooth capability which will enable selection of the preferred termination device to be based on (i) proximity of the user's mobile device with a WiFi router, or (ii) the GPS location of the user's mobile device, or (iii) proximity of the user's mobile device with a BETDD (Bluetooth Enabled Telephony/Data Device) secondary device.

The automatic selection of a given secondary device as a "preferred device" for terminating an incoming connection request may be based on (i) pre-configured associations between WiFi routers and one or more secondary devices, or (ii) pre-configured associations between a GPS location and one or more secondary devices or (iii) Bluetooth connectivity to one or more BETDD secondary devices.

Generally, when a user's mobile device has (i) connected to a specific WiFi router, or (ii) moved to a specific GPS location, or (iii) connected to a BETDD secondary device, this may allow for the easy or automatic selection of (i) a secondary device associated with the WiFi router, or (ii) a secondary device at this GPS location, or (iii) the BETDD secondary device, respectively, to be used to terminate incoming connection requests to the user's (primary) mobile device.

The invention allows the user to (i) create an association on the mobile device between different WiFi routers and the way of establishing a connection to a secondary device associated to each router, or (ii) create an association on the mobile device between different GPS locations and the way of establishing a connection to a secondary device at this location, or (iii) create an association on the Mobile Device between different BETDDs and the way of establishing a connection to each BETDD device. These associations may be, but are not limited to, Directory Numbers (DNs), contacts, and URIs.

When the user's mobile device (i) connects to a WiFi router, or (ii) to this GPS location, or (iii) connects with the BETDD device, the associated secondary device then can become the default ("preferred") terminating device to automatically terminate incoming requests and/or become an easily selectable device option (such as on a list on the mobile device display) for terminating the incoming connection request.

A similar but opposite action may be to remove the secondary device (i) associated with the WiFi router, or (ii) associated with the GPS location, or (iii) associated BETDD from the default or selection process when the user's Mobile Device (i) loses connection to the specific WiFi router, or (ii) moves away from the GPS location, or (iii) the Bluetooth connection with the BETDD device is lost, respectively.

Within the Mobile Device Application (MDA) controlling the connection request, the user may be allowed to select an option to (i) identify a WiFi router, or (ii) identify a GPS location, or (iii) identify a BETDD, and then choose a method of identifying a way to connect to a secondary device at that location. This could be by manually entering in a Directory Number or URI (such as in the case of a laptop/PC) or by even selecting this information from a Contact List, Recent Call List, etc. There can be multiple WiFi router/GPS locations and secondary device (including BETDD) associations that the Mobile Device Application recognizes and can connect to—limited only by the Mobile Device Application's storage.

Within the Mobile Device Application, when a user's Mobile Device (i) connects to a specific WiFi router, or (ii) is at a given GPS location, or (iii) connects with a given BETDD device, this may allow for the associated secondary device to become the default terminating device (sometimes referred to as a "preferred" or "primary" device) and/or may automatically add the secondary device to the Mobile Device Application's GUI displaying a dynamically built list of selectable devices for the user to pick from as the terminating device for the incoming connection request. Similarly, when the user's mobile device (i) loses connection with the WiFi router, or (ii) moves away from the given GPS location or (iii) loses connection with the BETDD device, respectively, then the secondary device may be removed from being the default terminating device and/or may be removed from any dynamically built list of selectable terminating devices.

An application on the user's mobile device 120a, which controls incoming calls, provides the user the possibility to associate one or more secondary devices 120b, 120c with (i) a connection with a particular WiFi router, or (ii) with a specific GPS location, or (iii) with a connection with a particular BETDD device. As soon as the mobile device (i) connects to a given WiFi router, or (ii) moves to the GPS location, or (iii) connects with the BETDD device, respectively, incoming calls may automatically be forwarded to the associated secondary device. Alternatively, the user is able to easily select a given secondary device from a list of (two or more) secondary devices which are displayed on the mobile device. At the time the mobile device (i) disconnects from a particular access point, or (ii) moves away from the GPS location, or (iii) loses connection with the BETDD device, incoming calls will no longer be forwarded to the associated secondary device (or the list to select a secondary device is not displayed any more).

By implementing the techniques disclosed herein, a user who is (i) connected to a specific WiFi router, or (ii) located in a specific GPS location, or (iii) or located in a location with a connected BETDD, would have the options to have the secondary device automatically configured to be the default device or have the secondary device added to a dynamically built list of selectable devices that incoming connection requests can be terminated to, without requiring any user action beyond the initial configuration. This provides a much easier and faster, automatic method than searching for the connection information (such as in a Contact List) associated with the (i) WiFi router, or (ii) GPS location, or (iii) BETDD, respectively.

As an example, if the user's desk phone (i) has an associated WiFi router, or (ii) is at a given GPS location, or (iii) is a BETDD, every time the user enters their office with their mobile device, and (i) the WiFi router connects or (ii) the GPS location is recognized or (iii) the connection with the BETDD is made, respectively, any data connection requests (e.g. phone call) would/could terminate directly to the desk phone.

This provides an improvement over previous techniques which require some type of manually-driven search to locate the connection information, and then more manual actions are needed to cause the connection to terminate at a selected secondary device.

Generally, the (i) WiFi router connection, or (ii) GPS location, or (iii) Bluetooth connection is automatically recognized by the Mobile Device Application. Once this (i) WiFi router connection, or (ii) GPS location, or (iii) Bluetooth connection) is recognized with an associated secondary device for terminating connection requests, then it is up to the Mobile Device Application (MDA) to take advantage of this knowledge. The connection may automatically be moved to this secondary device, have the default device replaced by the secondary device, or simply add the secondary device to a list of selectable devices for terminating the connection request (call).

An Exemplary Process Flow for Terminating an Incoming Connection Request FIG. 2A is a diagram showing a sequence 200 of steps and events in an exemplary method for selectably terminating an incoming connection request such as has been described hereinabove. Some options and variations may not be explicitly shown in the diagram.

In an exemplary first step 202, for each (i) WiFi router, or (ii) GPS location, or (iii) BETDD device that is to be recognized by the mobile device, the user does a onetime configuration (or "pre-configuration", which may, of course, later be modified) associating the (i) WiFi router, or (ii) GPS location, or (iii) BETDD device, respectively, with a connection method of reaching a secondary device at this location, such as an office phone directory number (DN), a home phone DN, a conference room phone DN, a laptop personal computer (PC), a desktop PC uniform resource identifier (URI), a tablet URI, etc.

In an exemplary next step 204, one of the following exemplary actions (or events) may occur,
 (i) the user enters a location where their mobile device establishes a connection with a WiFi router (i.e. office or home) that has been pre-configured in the step 202, or
 (ii) the user enters a location (such as their office) where a GPS location was pre-configured in the step 202 (such as to associate to the user's office desk phone DN as a "preferred" secondary device, or
 (iii) the user enters a location where their mobile device establishes a Bluetooth connection with a BETDD (e.g. such as the office phone, laptop, etc) that has been pre-configured in the step 202.

In an exemplary next step 206, the default termination device is set to the secondary service and/or the secondary device is added to a dynamically built list of selectable devices for quick selection by the user.

In an exemplary next step 208, while in this location, the user receives an incoming connection request to their Mobile Device Application (MDA).

In an exemplary next step 210, the Mobile Device Application, depending on the specific application/configuration, can either automatically offer the connection to the secondary device or present the secondary device as the default device and/or add this secondary device to the list of selectable termination devices offered to the user (such as via a GUI on their mobile device) without any searching.

In an exemplary next step 212, when the user leaves the area and (i) loses connection with the WiFi router, or (ii) moves away from the GPS location, or (iii) loses the Bluetooth connection with the BETDD, the secondary device is removed from being the default termination device and/or removed from the list of selectable devices.

In other words, for example, when a user is away from their office, calls come to their mobile device. Upon entering their office (as determined by WiFi connection, GPS location or Bluetooth connection), calls are automatically directed to a selected secondary device (or presented as a selection on the user's mobile device), such as their desk phone. Upon leaving their office, calls will cease being directed to the pre-selected secondary device and will resume coming to the user's mobile phone.

Moving an Active Call

Currently, the movement of the voice/data connection is a manual action where the device to move the connection to has to be manually identified or selected, such as looking up the device's DN (directory number) in a Contact List.

Automatically terminating a connection request (incoming call) has been described hereinabove, and generally involves a user pre-configuring selected (secondary) devices for terminating connection requests at different locations, based on the user's mobile device being in proximity (and connecting wirelessly) with a given WiFi router, being at a given GPS location, or being in proximity (and connecting via Bluetooth) with a given BETDD (Bluetooth Enabled Telephony/Data Device) device.

According to some embodiments of the invention, similar techniques to those described above for terminating a call request may be applied to an already existing (payload) connection, to move the connection from the user's mobile device (which is currently on the call) to one of the user's secondary devices, based on a "location identifier" for the secondary device, such as the secondary device (i) is associated to a particular WiFi router or access point (AP), or (ii) is associated to a particular location, such as GPS location, or (iii) is a BETDD device having a Bluetooth connection with the user's mobile device.

To move an active connection to a secondary device some exemplary actions taken by the user may include, but are not limited to, the user:

moving the (primary) mobile device in a particular manner, such as shaking it or swinging it in a given direction (upward, downward, side-to-side).

making a gesture on the touch screen of the mobile device pressing a button (or touching a GUI icon) on the mobile device speaking (entering a voice command) into the mobile device A similar (or opposite action) may be used to move the connection from the secondary device back to the mobile device. This movement of an active call "back" to the mobile device may apply as well to situations where the secondary device has automatically (or by selection from a list) terminated the connection request, as described above, wherein the mobile device was not previously the active connection.

The Mobile Device Application (MDA) allows the user to create an association (i) between different WiFi Routers and a telephony/data capable secondary device, or (ii) between different GPS locations and a telephony/data capable secondary device at each unique location, or (iii) between different BETDDs and a way of establishing a connection to each device, along with a way of establishing a connection to each secondary device. This could be, but is not limited to: Directory Numbers, Contacts, and URIs.

When an active connection exists on the mobile device, a given action such as, but not limited to:

voice command such as "move call", a particular motion of the Mobile Device such as a downward movement, or an action on the screen of the Mobile Device such as a button selection or gesture, moves the active connection from the Mobile Device to the secondary device associated with the currently connected WiFi Router of the Mobile Device.

A similar but opposite action could move the active connection from the secondary device to the mobile device.

The Mobile Device Application (MDA) may control the telephony/data connection by allowing the user to (i) select an option to identify a WiFi Router with a secondary device, or (ii) select an option to identify the GPS location with a secondary device, or (iii) select an option to identify a given BETDD secondary device, and then choose a method of associating a way to connect to the secondary device.

The connection could be, but is not limited to, established by manually entering in a Directory Number (DN) or URI (such as in the case of a PC) or by even selecting this information from a Contact List, Recent Call List, etc.

There can be (i) multiple WiFi Router and secondary device associations that the Mobile Device Application (MDA) recognizes and can connect to, or (ii) multiple GPS and secondary device associations that the Mobile Device Application (MDA) recognizes and can connect to, or (iii) as many associations as there are BETDDs that the Mobile Device Application (MDA) recognizes and can connect to, limited only by the Mobile Device Application's storage.

Within the Mobile Device Application, when the appropriate action is taken (such as the downward motion of the mobile device), a look up is done within the Mobile Device Application (MDA) to see (i) what secondary device is associated with the currently connected WiFi Router, or (ii) what secondary device is associated with the Mobile Device GPS location, or (iii) what BETDD the Mobile Device is connected to, and then the Mobile Device Application moves the connection.

Likewise, when the connection is on the secondary device, a similar action could move the active connection from the secondary device back to the mobile device.

This provides an improvement over previous techniques which require some type of manually-driven search to locate the connection information, and then more manual actions are needed to actually move the connection to a selected secondary device. Such manual actions normally require the user to focus their attention away from the current active connection (such as a voice call).

The techniques disclosed herein provide a much easier/faster method than searching for the connection information associating a secondary device with a given (i) WiFi Router, or (ii) GPS secondary device, or (iii) BETDD (such as in a Contact List). This allows the user to maintain much more focus on the active connection and can seamlessly move the connection around based on the Mobile Device Application (MDA) knowing the secondary device associated with the connected WiFi Router (or GPS location, or BETDD).

Alternatively, the initial configuration of associating (i) a WiFi router connection, or (ii) a GPS connection requires, or (iii) a BETDD connection may require an initial manual step.

The active connection movement could be done in multiple ways:

A motion of the Mobile Device such as a downward arm movement (while holding the device).

A voice command.

A simple/single action to the Application on the mobile device controlling the connection such as button selection or a gesture like a finger swipe.

An Exemplary Process Flow for Active Call Movement

FIG. 2B is a diagram showing a sequence 220 of steps and events in an exemplary method for active call movement such as described hereinabove. Some options and variations may not be explicitly shown in the diagram.

In an exemplary first step 222, for each (i) WiFi router, or (ii) GPS location, or (iii) BETDD device that is to be recognized by the mobile device, the user does a onetime configuration (or "pre-configuration", which may, of course, later be modified) associating the (i) WiFi router, or (ii) GPS location, or (iii) BETDD device, respectively, with a connection method of reaching a secondary device at this location, such as an office phone directory number (DN), a home phone DN, a conference room phone DN, a laptop personal computer (PC), a desktop PC uniform resource identifier (URI), a tablet URI, etc. This step 222 may be identical to the step 202 in the process flow 200 for terminating an incoming connection request.

In an exemplary next step 224, as an example, the user is on an active phone call on their mobile device, and
(i) the user enters a location where their mobile device automatically connects with a WiFi router (i.e. office or home) that has been pre-configured in the step 222, or
(ii) the user enters a location (such as their office) where a GPS location was pre-configured in the step 222 (such as to associate to the users office desk phone DN as a "preferred" secondary device), or
(iii) the user enters a location where their mobile device establishes a Bluetooth connection with a BETDD (e.g. such as the office phone, laptop, etc) that has been pre-configured in the step 222.

This step 224 is similar to the step 204 in the process flow 200, with the difference that the user is already on a call, and may want to move the call from the mobile device to a selected (pre-configured, associated) secondary device.

In an exemplary next step 226, the user performs an action with or on the mobile device, such as moving the mobile device downward. (i.e. arm holding device makes a downward motion by bending elbow in a quick motion) or making a touch input on the mobile device screen, or speaking a voice command, or any other action which is suitable to be recognized by the Mobile Device Application (MDA) as a command by the user to move the call to a pre-selected secondary device at the location.

In an exemplary next step 228, the Mobile Device Application (MDA) looks up the connection information associated with (i) the currently connected WiFi Router and identifies the associated device (e.g. desk phone), or (ii) GPS location, or (iii) BETDD (in this case, the office phone DN).

In an exemplary next step 230, the call is automatically moved (and offered to) the secondary device (such as desk phone) where it, by way of example, either rings (requiring answering/connecting) or is automatically connected depending on the capabilities of the secondary device.

In an exemplary next step 232, the user may perform another action on the mobile device to move the call back from the secondary device to the mobile device (bring the connection back to the mobile device). This action may be the same as the action which was performed to move the call from the mobile device to the secondary device, or a different action than that which was performed to move the call from the mobile device to the secondary device, including an "opposite" type of action, such as an upward arm motion or action on the mobile device. It is within the scope of the invention that the user performing an action on the secondary device may cause the call to be moved back to the mobile device, which may however require some additional functionality in the secondary device.

REFRENCE NUMERALS USED IN THE DRAWINGS

100 system
110 LAN
112 controller
114 Internet gateway
116 gateway for PSTN
118a,b WiFi Routers
120a primary (mobile) device
120b,c secondary devices
GPS the GPS satellite network
200 process flow, terminating a call
202-212 steps in the flow 200
220 process flow, moving a call
222-232 steps in the flow 220

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:

1. A method of telecommunication comprising:
providing functionality via a primary communication device of a user to associate a secondary communication device with the user, the primary communication device having a processor and non-transitory memory;
defining a condition in which a communication action is to automatically occur that involves the secondary communication device based on a location identifier, the location identifier comprising one of: (i) a connection between the primary communication device and an access point, (ii) a location of the primary communication device, (iii) a Bluetooth connection between the primary communication device and the secondary communication device, and (iv) a direct wireless communication connection between the primary communication device and the secondary communication device;
automatically performing the communication action upon a determination that the condition is met based on the location identifier, the communication action comprising at least one of:
(a) terminating an incoming connection request to the primary communication device by forwarding the incoming connection request to the secondary communication device, and
(b) moving an existing connection from the primary communication device to the secondary communication device; and
wherein the location of the primary communication device is a proximity of the primary communication device to the secondary communication device, the secondary communication device being configured to form a direct wireless communication connection with the primary communication device when the primary communication device is within the proximity of the secondary communication device.

2. The method of claim 1 wherein the communication action that is automatically performed is the terminating of the incoming connection request to the primary communication device by forwarding the incoming connection request to the secondary communication device.

3. The method of claim 1 wherein the communication action that is automatically performed is the moving of the existing connection from the primary communication device to the secondary communication device.

4. The method of claim 1 wherein the location identifier is the connection between the primary communication device and the access point.

5. The method of claim 4 wherein the access point is a router.

6. The method of claim 1 wherein the location identifier is the location of the primary communication device.

7. The method of claim 6, wherein the direct wireless communication connection is a Bluetooth connection.

8. The method of claim 1 wherein the location identifier is the direct wireless communication connection between the primary communication device and the secondary communication device or the Bluetooth connection between the primary communication device and the secondary communication device.

9. The method of claim 1 wherein the primary communication device is a mobile device, a smartphone, a personal digital assistant, an electronic tablet, or a laptop computer.

10. The method of claim 9 wherein the secondary communication device is a telephone or a personal computer.

11. The method of claim 1 wherein the primary communication device has a mobile device application (MDA) stored in the non-transitory memory, the MDA configured to facilitate the automatic performance of the communication action.

12. The method of claim 1 wherein the communication action that is automatically performed is the terminating of the incoming connection request to the primary device by forwarding the incoming connection request to the secondary communication device, the forwarding of the incoming connection request comprising automatically terminating the incoming connection request at the secondary communication device.

13. The method of claim 1 wherein the communication action that is automatically performed is the moving of the existing connection from the primary communication device to the secondary communication device, the moving of the existing connection from the primary communication device to the secondary communication device comprises one of: use of the access point connected to the primary communication device and direct wireless communication connectivity between the primary device and the secondary communication device.

14. The method of claim 13 wherein the moving of the existing connection uses the access point to effectuate the moving of the existing connection.

15. The method of claim 13 wherein
the moving of the existing connection comprises the use of the direct wireless communication connection.

16. A non-transitory computer readable medium having a computer program stored thereon, the computer program defining a method that is performed by a communication device that executes the computer program, the method comprising:
defining a condition in which a communication action is to automatically occur that involves a secondary communication device based on a location identifier, the location identifier comprising one of: (i) a connection between a primary communication device and an access point, (ii) a location of the primary communication device, (iii) a Bluetooth connection between the primary communication device and the secondary communication device, and (iv) a direct wireless communication connection between the primary communication device and the secondary communication device;
automatically performing the communication action upon a determination that the condition is met based on the location identifier, the communication action comprising at least one of:
(a) terminating an incoming connection request to the primary communication device by forwarding the incoming connection request to the secondary communication device, and
(b) moving an existing connection from the primary communication device to the secondary communication device; and
wherein the location identifier is the location of the primary communication device, the location of the primary communication device being a proximity of the primary communication device to the secondary communication device, the secondary communication device being configured to form a direct wireless communication connection with the primary device when the primary device is within the proximity of the secondary communication device.

17. The non-transitory computer readable medium of claim 16 wherein the direct wireless communication connection between the primary communication device and the secondary communication device is a Bluetooth connection between the primary communication device and the secondary communication device.

18. The non-transitory computer readable medium of claim 16 wherein the moving of the existing connection comprises the use of the direct wireless communication connection.

* * * * *